(12) United States Patent
Schuster

(10) Patent No.: US 7,433,540 B1
(45) Date of Patent: Oct. 7, 2008

(54) DECOMPOSING NATURAL IMAGE SEQUENCES

(75) Inventor: Michael D. Schuster, Woodside, CA (US)

(73) Assignee: Adobe Systems Incorporated, San Jose, CA (US)

( * ) Notice: Subject to any disclaimer, the term of this patent is extended or adjusted under 35 U.S.C. 154(b) by 867 days.

(21) Appl. No.: 10/643,279

(22) Filed: Aug. 18, 2003

Related U.S. Application Data

(60) Provisional application No. 60/421,269, filed on Oct. 25, 2002.

(51) Int. Cl.
*G06K 9/36* (2006.01)
*G06K 9/40* (2006.01)

(52) U.S. Cl. .................. 382/284; 382/260; 345/629; 348/584

(58) Field of Classification Search ......... 382/260–265, 382/276, 284; 345/629–641; 348/584–601
See application file for complete search history.

(56) References Cited

U.S. PATENT DOCUMENTS 6,411,742 B1 6/2002 Peterson
6,697,652 B2 * 2/2004 Georgakoudi et al. ....... 600/310

OTHER PUBLICATIONS

Shum, Heung-Yeung & Szeliski, Richard, "Panoramic Image Mosaics", Sep. 1997, Technical Report MSR-TR-97-23, http://www.research.microsoft.com/research.

Weiss, Yair, "Deriving Intrinsic Images from Image Sequences", 2001, Proc ICCV, Computer Science Division, University of California Berkeley, Berkeley, CA.

Olshausen, B.A. and Field, D.J. "Emergence of simplecell receptive field properties by learning a sparse code for natural images", 1996, Nature, 381.

Kruizinga, P. and Petkov, N., "Nonlinear Operator for Oriented Texture", 1999, IEEE Trans. Image Processing, vol. 8, No. 10.

Barrow, et al., "Recovering Intrinsic Scene Characteristics from Image", Computer Vision Systems, A. Henderson and E. Riseman (Eds.), Academic Press, 1978, pp. 3-26.

Fairchild, "Refinement of the RLAB Color Space", Color Res. Appl. 21, 1996, 338-346, downloaded from the internet at http://www.cis.rit.edu/fairchild/PDFs/PAP03.pdf on May 12, 2008, 37 pages.

International Electrotechnical Commission "CEI IEC 61966-2-1 Multimedia Systems and Equipment - Colour Measurement and Management Part 2-1: Colour Management - Default RGB Colour Space - sRGB", Oct. 1999, 15 pages.

* cited by examiner

*Primary Examiner*—Aaron W Carter
(74) *Attorney, Agent, or Firm*—Fish & Richardson P.C.

(57) ABSTRACT

Techniques for recovering reflectance and illumination from natural image sequences, which techniques can be implemented separately, or combined. The images in a sequence of images can be aligned. The images can also be transformed into the log opponent color domain to increase filter sparseness and reduce chrominance errors. Additionally, a collection of filters spanning frequency space can be employed that reduce low frequency artifacts.

34 Claims, 8 Drawing Sheets

705

710

715

720

725

730

735

740

745

750

DECOMPOSING NATURAL IMAGE SEQUENCES

CROSS-REFERENCE TO RELATED APPLICATIONS

This application claims the benefit of U.S. Provisional Application No. 60/421,269, filed on Oct. 25, 2002, which is incorporated by reference herein.

BACKGROUND

The present invention relates to representing and analyzing sequences of images of a natural scene.

It has been proposed that natural images can be described in terms of intrinsic characteristics, such as range, orientation, reflectance, and incident illumination of the surface element visible at each point in the image H. G. Barrow & J. M. Tenenbaum, *Recovering intrinsic scene characteristics from images*, in A. Hanson & E. Riseman, editors, *Computer Vision Systems*, Academic Press (1978). The extraction of information describing such characteristics is complicated, however, by the fact that the information representing the combined characteristics for each pixel in an image is confounded ID a single pixel value representing the intensity of light captured for the corresponding location. The decomposition of these pixel values to obtain information corresponding to intrinsic characteristics depends on the introduction of constraints derived from assumptions about the scene and the imaging process.

In one approach to the problem of decomposing an image sequence including t images into constant reflectance and varying illumination such that:

$$I^t = R^t \quad (1)$$

the images I' are first transformed into the log domain where their compositions as component-wise products of reflectance and illumination are replaced by component-wise sums of corresponding logged terms:

$$i^t = r + l_t \quad (2)$$

where $i^t$, r, and $l^t$ denote the logs of $I^t$, R, and $L^t$.

Vertical and horizontal derivative filters $f_1$ and $f_2$ are then applied to i':

$$i_n^t = r_n + l_n^t \quad (3)$$

where $i_n^t$, $r_n$, and $l_n^t$ denote the convolutions $f_n*i^t$, $f_n*r$, and $f_n*l^t$. When applied to natural images, the outputs of these filters tend to be sparse. That is, the probability distributions of their outputs are peaked at zero and fall off much more rapidly than Gaussian. Under the assumption that the illumination term $l_n^t$ in equation (3) is sparse, an estimate $\hat{r}_n$ of $r_n$ is obtained by applying the median over time to $i_n^t$:

$$\hat{r}_n = \text{median}_t(i_n^t) = \text{median}_t(r_n + l_n^t) \quad (4)$$

This estimate follows from the observation that if $l_n^t$ at some pixel is within ϵ of zero more than 50% of the time, then by definition the median over time of $r_n + l_n^t$ at that pixel will be within ϵ of $r_n$.

Finally, an estimate $\hat{r}$ of r is reconstructed by solving the over-constrained linear system:

$$f_n * \hat{r} = \hat{r}_n \quad (5)$$

An image $\hat{r}$ whose filter outputs match those determined by the estimator in equation (4) is sought.

A pseudo-inverse solution is employed to recover the best $\hat{r}$ in the least squared error sense. The solution is given by:

$$\hat{r} = g * \left( \sum_n f_n^r * \hat{r}_n \right) \quad (6)$$

with $f_n^r$ the reversed filter of $f_n$ and g a solution to:

$$g * \left( \sum_n f_n^r * f_n \right) = \delta \quad (7)$$

Due to the DC-free nature of the filters, a DC term for $\hat{r}$ is not recovered by equation (6). This term is set equal to the median over time of the DC terms of $i^t$. Estimates $1_t$ of illumination $l^t$ are found by rewriting equation (2) as:

$$l^t = i^t - \hat{r} \quad (8)$$

Estimates $\hat{R}$ and $\hat{L}^t$ of R and $L^t$ are found by applying exponents to $\hat{r}$ and $\hat{l}^t$.

SUMMARY OF THE INVENTION

The invention provides methods and apparatus, including computer program products, implementing techniques for extracting a single reflectance image and a series of illumination images from a sequence of images of a natural scene. The techniques solve the following image decomposition problem: Given a sequence of T images of a scene $\{I^t\}_{t=1}^T$ where the reflectance is constant and only the illumination changes, estimate T illumination images $\{L^t\}_{t=1}^T$ and one reflection image R such that $I^t = RL^t$. A maximum-likelihood estimator is applied under the assumption that illumination images will give rise to sparse filter outputs. A log opponent color domain can be used to increase filter sparseness. A plurality of filters that span frequency space and orientation can be used to reduce low frequency artifacts.

In general, in one aspect, the invention features methods and apparatus, including computer program products, for decomposing images in a sequence of images representing a scene. Images in a sequence of images are transformed into a log opponent color domain. Filters are applied to the transformed images to generate sequences of filtered images, the filters including derivative filters applied to reveal derivatives in at least two directions. A median image is calculated for each sequence of filtered images. The median images are used to calculate a reflectance image for the sequence of images, such that applying the filters to an image which is represented by the reflectance image would yield substantially the calculated median images for the sequences of filtered images.

In general, in another aspect, the invention features other methods and apparatus for decomposing images in a sequence of images representing a scene. Images in a sequence of images are transformed into a log domain. Filters are applied to the images, the filters including derivative filters to be applied to reveal derivatives in at least two directions and an additional filter. A median image is calculated for each of the plurality of sequences of filtered images. The median images are used to calculate a reflectance image for the sequence of images, the reflectance image representing an image the application to which the plurality of filters would yield substantially the calculated median images for the sequences of filtered images.

Particular implementations can include one or more of the following features. A sequence of illumination images corresponding to the images in the sequence of images can be calculated such that each image is the product of the reflectance image and the illumination image. The reflectance or illumination images can be modified. The modified reflectance or illumination images can be used to create a new sequence of images. Alternatively, the modified reflectance or illumination images can be used to generate a new image. Calculating the reflectance image can include calculating a reflectance image having a minimum least squared error between the result of application of each of the plurality of filters to the reflectance image and the calculated median image for the corresponding filter. Applying the filters can include applying three or more filters, applying three or more directional filters, applying lower frequency filters or any combination of these different filters, or applying each of the filters to each of the luminance and chrominance colorants of the opponent color space for each pixel. The images of the sequence of images can be aligned any time before calculating the median image.

The invention can be implemented to provide one or more of the following advantages. Aligning images in the image sequence permits the techniques to be used with a handheld camera or other apparatus that captures sequential images. Using the opponent color space reduces color artifacts, such as halos or inaccurate chrominance, in the estimated reflectance image. Brightness across large areas may be more uniform than when other techniques are used to derive reflectance and illumination images. Applying multiple sparse filters improves the estimated reflectance image by reducing the output of low frequency errors. Objects that are out of focus in some images in a sequence can be represented in proper focus in a single image representing a scene, provided that the objects are in focus in a sufficient number of images in the sequence. Moving foreground or background objects can be removed from a sequence of images. Changes in illumination from one image to the next in a sequence can be reduced or eradicated. Reflectance or illumination changes can be removed from the images, a new object inserted into the images, and reflectance or illumination reapplied or altered, causing the new object to appear as part of the natural scene. Changes in illumination or reflectance can be made, such that each image in the sequence incorporates the change.

The details of one or more embodiments of the invention are set forth in the accompanying drawings and the description below. Other features, objects, and advantages of the invention will be apparent from the description and drawings, and from the claims.

DETAILED DESCRIPTION

Figure 1:
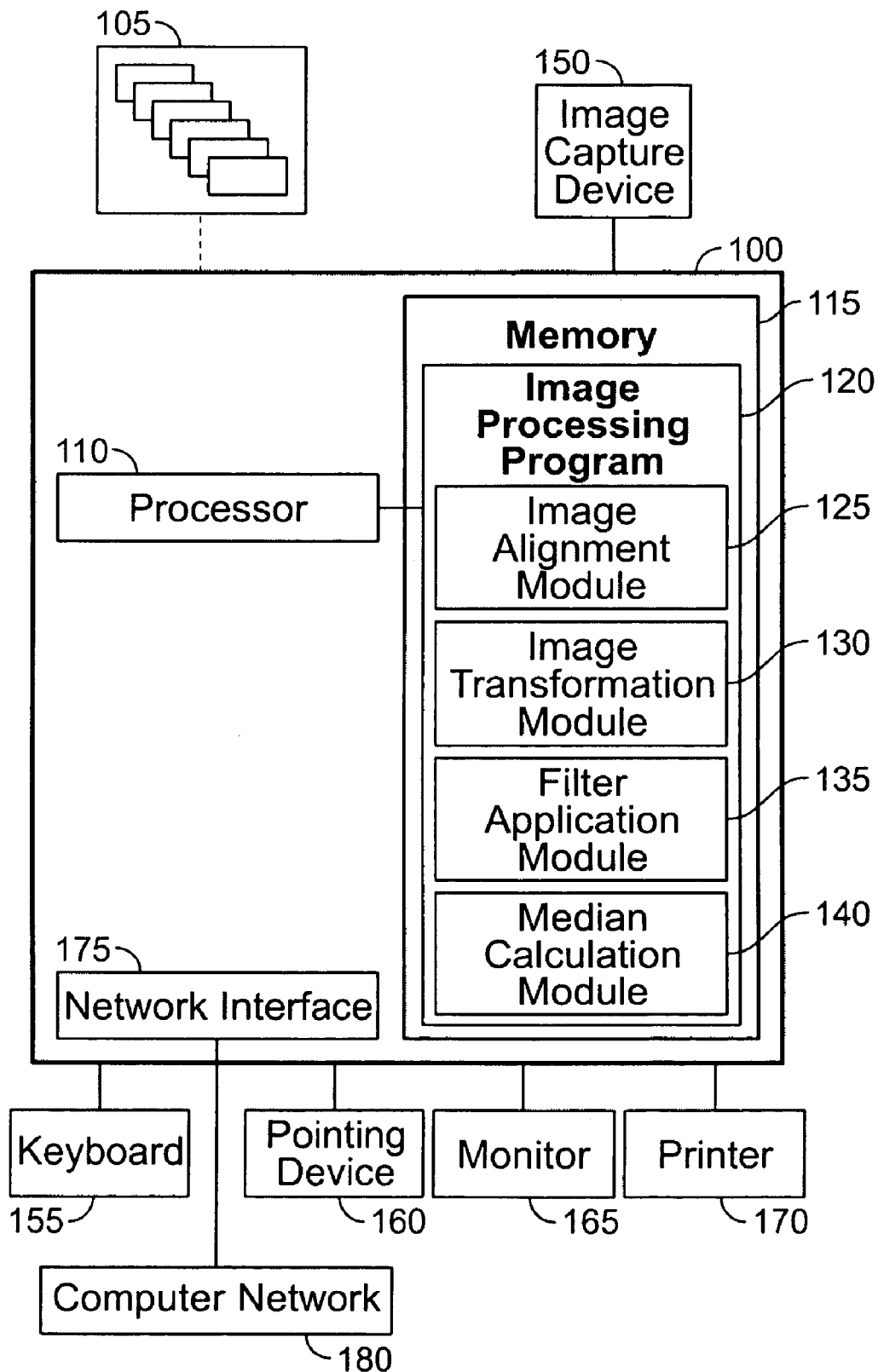
FIG. 1 is a block diagram of a system for decomposing a sequence of natural images.

Referring to FIG. 1, a computer system 100 for processing images in a natural image sequence 105 includes computer-readable memory 115 and a processor 110 for executing an image processing program 120. Image processing program 120 is operable to estimate reflectance in the image sequence 105, which is stored in memory 115. Image processing program 120 includes an image alignment module 125, an image transformation module 130, a filter application module 135, and a median calculation module 140. The computer system 100 can be associated with an image capture device 150 (such as a digital camera or camcorder) for capturing the images 105 in a digital format, a computer keyboard 155, and a pointing device 160 for capturing input from a user (not shown). The computer system 100 can also be associated with a monitor 165 for displaying images, and a printer 170 for printing. The computer system 100 can also include a network interface 175 for communicating with devices connected to a computer network 180, such as a local- or wide-area network or the Internet.

Figure 2:
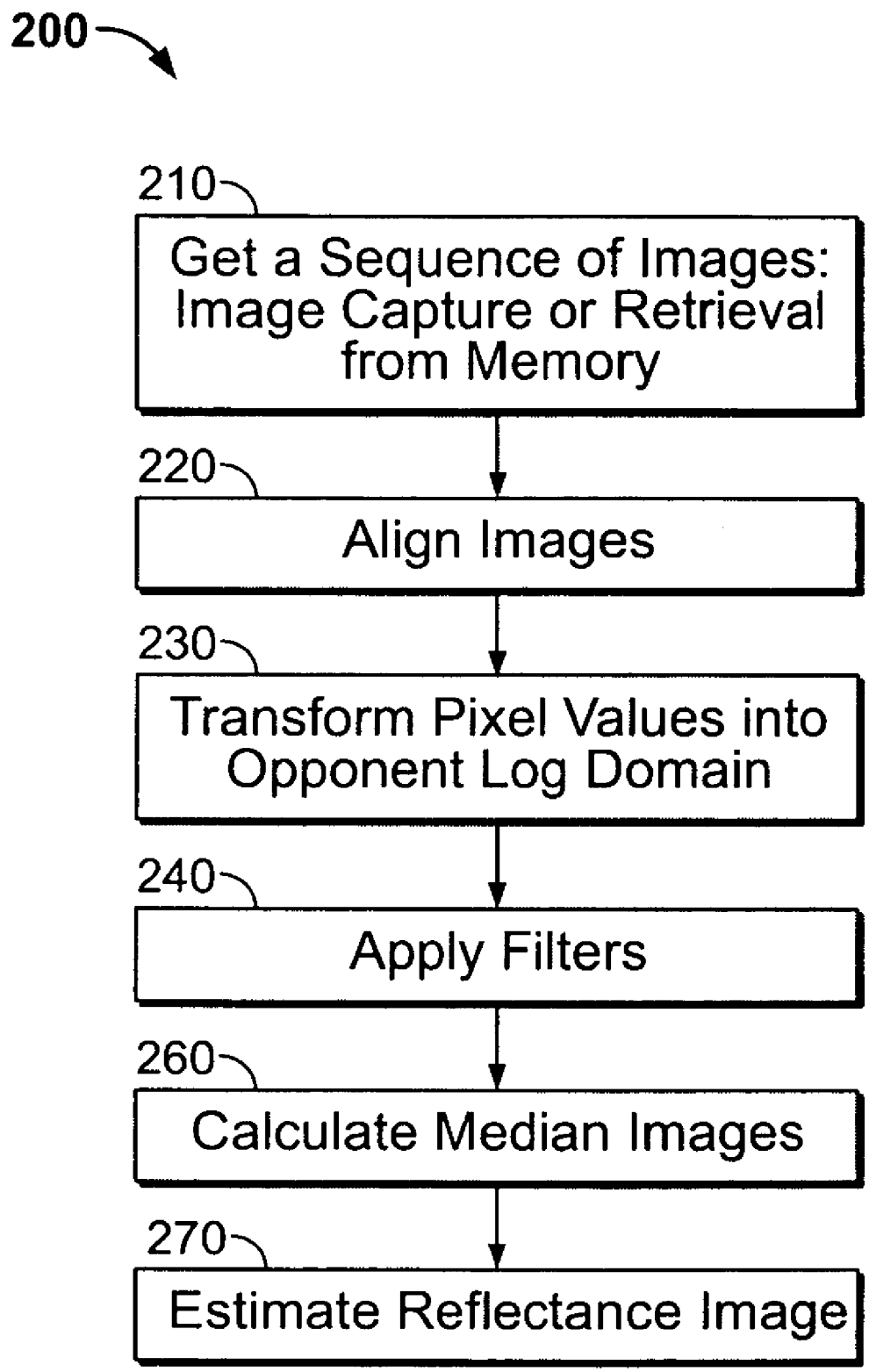
FIG. 2 is a flow diagram illustrating a method of calculating the reflectance of a sequence of natural images.

FIG. 2 is a flow diagram illustrating one method 200 of estimating the reflectance of a sequence of natural images. According to the method, a sequence of three or more digital images 105 of a natural scene is obtained (step 210). In particular implementations, the sequence of images 105 is a sequence of images or a scene in which most objects in the scene are not changing or moving, with the exception of illumination or reflection changes. Each digital image is an array of pixel values for pixels representing locations in a regular grid. The pixel values represent the color expressed at each corresponding location in the grid. The specific color expressed at each location is a combination of the components of a parameterized color space. For example, in the RGB color space, the array specifies the amount of each of the three components—red, blue, and green—that combine to produce the color expressed at each pixel.

The sequence of images 105 can be obtained when the user of the computer system 100 captures a sequence of natural images 105 with an image capture device 150 or retrieves the images 105 from the computer system's memory 115 or from a remote location over computer network 180. As noted above, the sequence contains a minimum of 3 images; additional images may improve the quality of the reflectance estimation. In general, most or all of the images in the sequence should overlap with one other image in the sequence to a significant degree. Complete overlap of each image is not required; in preferred implementations, however, each image will overlap with one or more other images by approximately 90%. Additionally, it is assumed that most or all of the images in the sequence are substantially similar to one another—that is, most objects in the scene, other than a relatively small number of moving objects (and not considering shadows or other lighting changes), remain in substantially the same place across the images of the sequence. This is generally true when the images have been captured using a photographic device that is either substantially stationary or is able to capture the images such that objects remain in the same place. Too little overlap, or too great differences, between images may make it difficult to identify changes between images of the sequence, although this can be overcome to some extent by increasing the number of images in the sequence. Optionally, individual images that do not overlap with other images in the sequence, or that represent markedly different views of the scene (e.g., images captured at significantly different angles from the other images in the sequence) can be removed from the sequence before the processing begins.

To compensate for small movements of the camera (e.g., shaking resulting from normal motion of a handheld camera), the images in the sequence can be aligned with one another (step 220). This alignment step can be implemented to register the images with one another. Failure to register the images can result in ghosting, blurring or fading in the estimated reflectance image resulting from an improper overlapped mixing of two or more of the images. The images of the sequence are transformed into the log domain (i.e., a log is taken of the pixel value or values at each pixel in each image) (step 230). Each image, I, can be represented as a component-wise product of image reflectance, R, and image luminance, L. For a sequence of images 105, $I^t = RL^t$. Thus, the corresponding log terms of the images are component-wise sums, $i^t = r + l^t$.

Before transforming the images into the log domain, the colors (i.e., pixel values) in the images in the sequence of images can be transformed into a color space of the user's choice or into a color space automatically selected by image processing program 120. In one implementation, the image colors are transformed into an opponent color space—that is, a color space in which chromaticity is parameterized in components representing a red-green channel and a blue-yellow channel. The color space transformation is discussed in more detail below.

Two or more filters are then applied to each image in the sequence of images to produce a plurality of filtered images (step 240). At least two directional derivative filters are applied (e.g., horizontal and vertical derivative filters) to each image in the sequence of images. The application of derivative filters provides a measurement of the rate of change of pixel values in a given direction in the image, producing derivatives that can reveal the edges of objects and the boundaries of illuminated regions. The orientations of the edges in the filtered images depend on the filter that is applied. For example, a vertical filter compares pixels on a pixel-by-pixel basis in a vertical direction and generally produces derivatives that reveal horizontal edges or illumination changes in the image. Similarly, a horizontal filter is sensitive to vertically oriented edges and illumination changes.

In one implementation, a collection of three or more filters is applied to the images in the sequence of images. The collection of filters can include derivative filters that can be applied to produce derivatives in a plurality of directions and/or at various frequencies, as will be described in more detail below.

A median image of the filtered images is calculated (step 250). The median image can be calculated as a component-wise median of the sequence of filtered images. By including only the median value for each pixel in a filtered image, the median image will tend to identify only relatively stationary edges and will therefore exclude moving edges, which can correspond to objects or illumination changes that move over the course of the image sequence. In one implementation, each color component is filtered separately and the filtered components of the images are grouped together prior calculating the median, producing multiple medians for a single-sequence of images. The median for all the group medians is then calculated. The median images can be tiled spatially to reduce the computer system's memory requirements.

The derived median image is used to calculate an estimated reflectance image (step 260). The estimated reflectance image corresponds to an image that, when processed by the filters in the collection of filters, would yield the derived median image calculated above (or median of the groups of medians), and is calculated by applying a maximum-likelihood estimator to find the solution in a least squared error sense.

Figure 3:
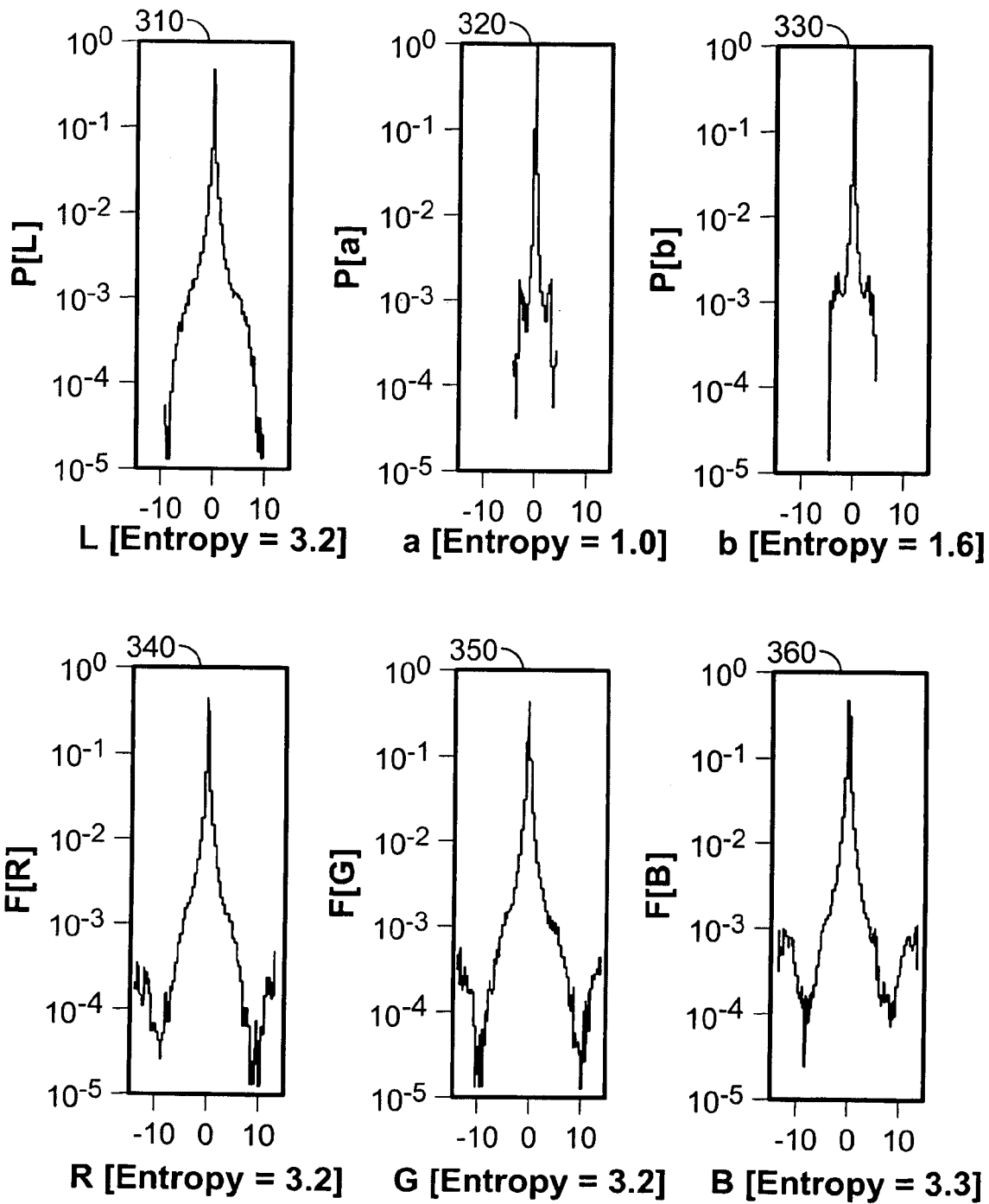
FIG. 3 is a graphical representation of a sparse derivative filter applied in an opponent color domain and an RGB color domain.

As discussed above, in one implementation the images in the sequence of images are transformed into an opponent color domain, in which colors are parameterized in dimensions of chrominance and luminance, before the filters are applied. The use of an opponent color space can be advantageous for several reasons. First, typically within a single image changes in the luminance channel delineate objects from one another more than changes in the chrominance channels. Second, as the illumination on an object changes from one image to another within the sequence of images, the color values of that object change less than the luminance values change. Third, many image capture devices encode the chrominance channels at a lower resolution than the luminance channel. Therefore, a large class of image sequences can be expected to exhibit relatively lower chrominance bandwidth, resulting in filter outputs 310, 320, 330 in the chrominance channels that are sparser than filter outputs 340, 350, 360 produced in other color spaces. FIG. 3 shows the filter outputs of each channel of the Lab and RGB color spaces. The L channel represents luminance, the a and b channels represent chrominance. The a and b channels, or red/green and yellow/blue channels, 320, 330 of the Lab color space are sparser than the filter outputs of the Red 340, Green 350, and Blue 360 channels of the RGB color space. Thus, the opponent color domain yields better estimations of reflectance.

Using an opponent color space can reduce color artifacts in the estimated reflectance image from a sequence of images. Application of similar techniques to images in the RGB color space can lead to the appearance of color bleeding around object edges in the RGB estimated reflectance image, for example, chrominance errors appearing as prismatic halos around edges. Additionally, improper color determination in large areas tends to occur. By contrast, if the same sequence of images is transformed into and processed in the opponent color domain, chrominance errors are reduced and chrominance channel sparseness increases in the opponent color domain estimated reflectance image. In one implementation, the images can be converted into and processed in a log opponent color domain that is a variant of Fairchild's RLAB in which a log nonlinearity has been substituted for the power function. See M. Fairchild. *Refinement of the RLAB Color Space. Color Research and Application,* 21, 1996, which is incorporated by reference herein.

To apply the conversion to the opponent color domain, it is assumed that the images $I^t$ are specified in terms of the sRGB with component values encoded linearly. IEC 61966-2-1 Ed. 1.0. "Multimedia systems and equipment—Colour measurement and management—Part 2-1: Colour management—Default RGB color space—sRGB," October, 1999, which is incorporated by reference herein. The definitions of $i^t$, r, and $l^t$ in the equation $i^t = r + l^t$ are replaced with:

$$i^t = P \log(QI^t)$$

$$r = P \log(QR)$$

$$l^t = P \log(QL^t) \tag{9}$$

The matrix Q maps a linear sRGB vector to normalized XYZ. The matrix P maps log normalized XYZ to the log opponent color domain. P and Q are given by:

$$P = \begin{bmatrix} 0 & 1 & 0 \\ 4.3 & -4.3 & 0 \\ 0 & 1.7 & -1.7 \end{bmatrix}$$

$$Q = \begin{bmatrix} .4339 & .3762 & .1899 \\ .2126 & .7152 & .0722 \\ .0177 & .1095 & .8728 \end{bmatrix}$$

It follows from the definitions in (9) that the decomposition of the image sequence defined by $I^t = RL^t$ is performed in the log opponent color domain with respect to a linear transform defined by the matrix Q and given by:

$$QI^t = (QR)(QL^t) \tag{10}$$

Expressing the component-wise multiplication in equation (10) as an equivalent diagonal matrix product and solving for I' obtains:

$$I^t = Q^{-1} diag(QL^t) QR \tag{11}$$

The right hand side of this equation may be interpreted as a product of an illumination matrix $Q^{-1} diag(QL^t)Q$ and reflection R.

Figure 4:
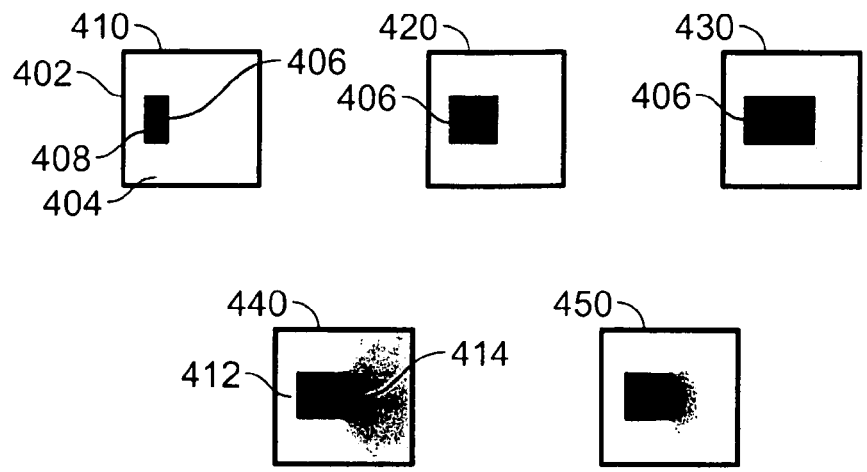
FIG. 4 is a comparison of reflectance images extracted from a sequence of three artificial images using two filters and using multiple filters.

Referring to FIG. 4, a synthetic image sequence capturing the characteristics of an attached shadow on a constant background shows the results of applying derivative filters, which typically reveal high-frequency spatial detail (e.g., edges) in a particular direction of interest. In image 410, an object's shadow 402 is shown against a constant background 404. The right edge of the shadow 406 moves in each image 410, 420, 430 while the left edge 408 remains stationary. In an output image 440 resulting from the application of horizontal and vertical derivative filters to the sequence of images 410, 420, 430, the pixels along the left edge 408 of the shadow filter outputs are not sparse across time and so they are not discounted by the estimator in $\hat{r}_n = \text{median}_t(i_n^t) = \text{median}_t(r_n + l_n^t)$. Along the right edge 414, filter outputs are sparse and are discounted. These local estimates result in global inconsistencies in filter outputs. Although using horizontal and vertical derivative filters is complete in the sense that they form a full basis for image space and high frequencies are well reconstructed, these filters' sensitivity to low frequencies is relatively small. This leads to objectionable low frequency errors in the background. This change in sensitivity results in a frequency dependent bias in how errors are weighted in the least squares solution given by $$\hat{r} = g * \left( \sum_n f_n^r * \hat{r}_n \right),$$

high frequency errors receiving more weight than low frequency errors.

This frequency bias can by reduced by employing a collection of filters that includes derivative filters applied in a plurality of directions and/or sparse filters with bandpasses that cover a larger portion of frequency space. In image 450, where the collection of filters has been applied, low frequency errors are reduced at a relatively small cost in high frequency reproduction. The application of the collection of filters causes illumination changes to be discounted and the final solution to be smoother than when only the high-frequency horizontal and vertical derivative filters are applied.

The collection of filters can include derivative filters configured to produce a derivative in directions other than horizontal and vertical, and/or filters that produce derivatives at other (i.e., lower) frequencies than the conventional derivative filters discussed above (which produce a derivative calculated on a pixel-wise basis). In one implementation, lower frequency filters are applied by sampling image pixels at a less than pixel-by-pixel frequency. For example, lower frequency filters can be applied by dividing each image into areas (e.g., squares of 2×2, 3×3, or more pixels) and averaging pixel values for all pixels in each area to generate a low frequency image, and then applying conventional derivative filters to the low frequency images. Factors such as the size and resolution of the images and the computational abilities of the computer system can affect the frequency selection and the number of different frequencies selected. Due to the computational intensity of applying multiple filters to a sequence of images, convolutions can be computed by fast Fourier transform and cached in temporary files.

Figure 5:
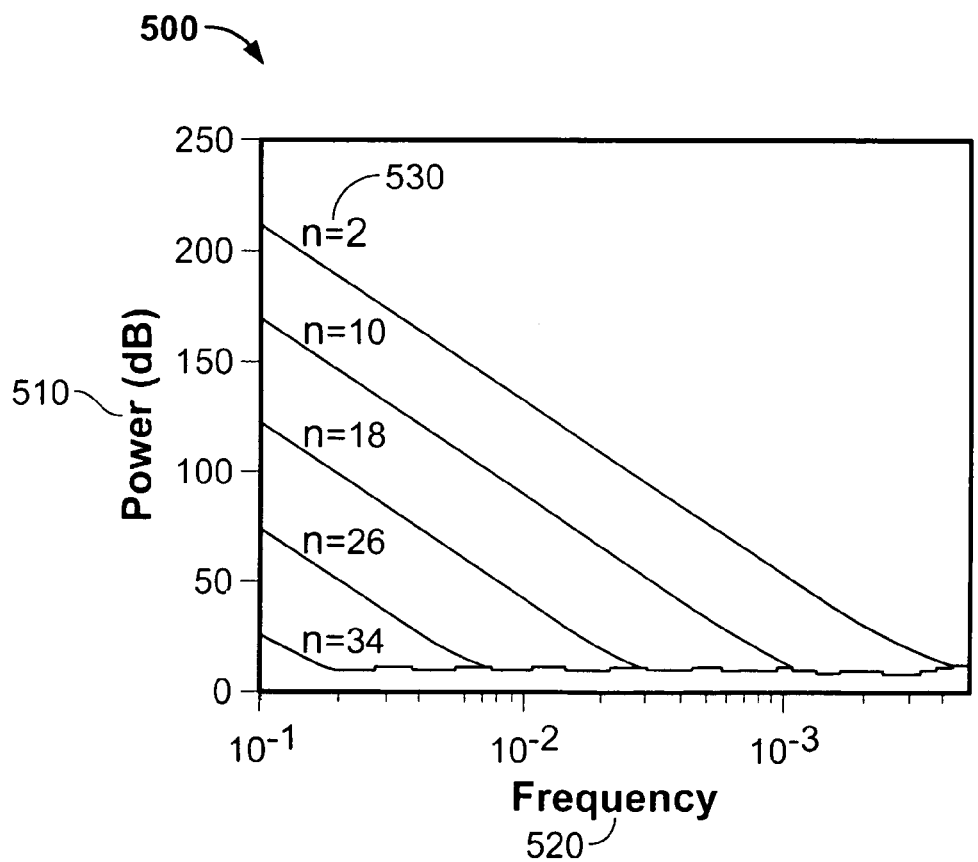
FIG. 5 is a graph of the radial power spectrum of a filter as a function of frequency.

Referring now to FIG. 5, an alternate approach to understanding the effect of applying a collection of filters is illustrated. The term g defined in $$g * \left( \sum_n f_n^r * f_n \right) = \delta$$

can be viewed as a filter operating on a superposition of estimated filtered reflectance. Graph 500 shows the radial power spectrum 510 of this filter as a function of frequency 520 and the total number of sparse filters 530, n. Increasing the number of filters results in frequency space being sampled more uniformly, reducing the amount of low frequency amplification required and distributing estimation errors more uniformly across all frequencies.

Olshausen and Field showed that a family of localized, oriented and bandpass filters are complete and maximize sparseness on natural images. B. A. Olshausen and D. J. Field. *Emergence of Simple-cell Receptive Field Properties by Learning a Sparse Code for Natural Images*. Nature, 381, 1996, which is incorporated by reference herein. It is assumed that these properties are preserved for images represented in the log opponent color domain.

The filters in the collection of filters can be modeled as normalized and offset Gabor functions, P. Kruizing a and N. Petkov. *Nonlinear Operator for Oriented Texture*. IEEE Transactions on Image Processing, Vol. 8, No. 10, 1999, which is incorporated by reference herein. The filters $f_n$ for n>2 are defined as:

$$f_n = k_n g_n (s_n - c_n), n > 2 \tag{12}$$

for Gaussian $g_n$, sinusoid $s_n$, normalization constant $k_n$, and offset constant $c_n$. Filters $f_1$ and $f_2$ remain defined as the vertical and horizontal derivative filters with kernels normalized as:

$$f_1 = \begin{bmatrix} 0 & 0 & 0 \\ 0 & 1 & 0 \\ 0 & -1 & 0 \end{bmatrix}$$

$$f_2 = \begin{bmatrix} 0 & 0 & 0 \\ 0 & 1 & -1 \\ 0 & 0 & 0 \end{bmatrix}$$

The normalization constant in $f_n = k_n g_n(s_n - c_n)$ is defined so that the filter's total spectral power scales as $f^2$ where f is the filter's central frequency. Spectral power of natural images scales inversely so that filter outputs have probability distributions that are roughly independent of their bandpass location. In the log opponent domain, this normalization will result in more uniformity in squared errors as a function of frequency in the reconstruction defined by $$\hat{r} = g * \left( \sum_n f_n^r * \hat{r}_n \right).$$

The offset constant $c_n$ is defined so that the filters are DC-free, a necessary condition for sparseness.

The Gaussian, sinusoid, and constant terms are given by:

$$g_n = \exp\left( -\frac{x'^2 + \gamma_n^2 y'^2}{2\sigma_n^2} \right)$$

$$s_n = \cos\left( \frac{2\pi x'}{\lambda_n} + \varphi_n \right)$$

$$k_n = \frac{2}{\sigma_n \lambda_n} \sqrt{\frac{2\gamma_n}{\pi k_n'}}$$

$$k_n' = \begin{cases} 1 + \exp(-4c_n'), & \cos(\varphi_n) = 0 \\ 1 + 3\exp(-4c_n') - 4\exp(-3c_n'), & \sin(\varphi_n) = 0 \\ \langle tbd \rangle, & \text{otherwise} \end{cases}$$

$$c_n = \exp(-2c_n') \cos(\phi_n)$$

$$c_n' = \frac{\pi^2 \sigma_n^2}{\lambda_n^2}$$

$$\sigma_n = \frac{\lambda_n}{\pi} \sqrt{\frac{\log(2)}{2} \frac{2^{b_n} + 1}{2^{2n} - 1}}$$

$$x' = x \cos(\phi_n) - y \sin(\phi_n)$$

$$y' = x \sin(\phi_n) + y \cos(\phi_n)$$

where x and y are spatial positions in pixels.

Some empirically derived free parameter values can be given by:

$$\varphi_n = \frac{\pi}{2}$$

$$b_n = 2$$

$$\gamma_m = 1.2$$

$$\phi_n = \frac{\pi}{4} (\text{mod}(n-3, 4) - 2)$$

$$\lambda_n = 2^{div(n-3,4)+2}$$

where $\phi_n$ specifies sinusoid phase offset. $b_n$ specifies filter bandwidth in octaves. $\gamma_n$ specifies Gaussian ellipticity. $\phi_n$ specifies sinusoid orientation. $\alpha_n$ specifies sinusoid wavelength in pixels. The bandwidth and ellipticity parameters are adjusted to provide a reasonably smooth coverage of frequency space.

Other filters, including any sparse filter or sparse derivative-like filter can be used in the techniques described herein instead of or in addition to the filters described above.

In one implementation, particular images from the sequence are weighted in the calculation. Images which are determined to be closer to the desired output may be included in the sequence multiple times. That is, images can be replicated at any point in the calculation prior to finding the median to cause the calculation to weight those images more heavily than the other images in the sequence.

In some implementations, the images in the sequence can be aligned. Images recorded by a tripod-mounted or handheld camera can be affected by movement of the tripod system, the camera, or the user. When compared to the sequence of images, a template image can reveal the horizontal, vertical, and rotational differences between the images. Inexact image alignment affects the image registration. Failure to align the images can result in poor quality constant reflectance image estimation and even ghosting. If alignment is required, it can be performed according to known techniques. One description of alignment can be found in U.S. Pat. No. 6,411,742, issued Jun. 25, 2002, which is incorporated by reference herein. In some implementations, the alignment can be performed at any point in the method prior to calculating a median image.

Figure 6A:
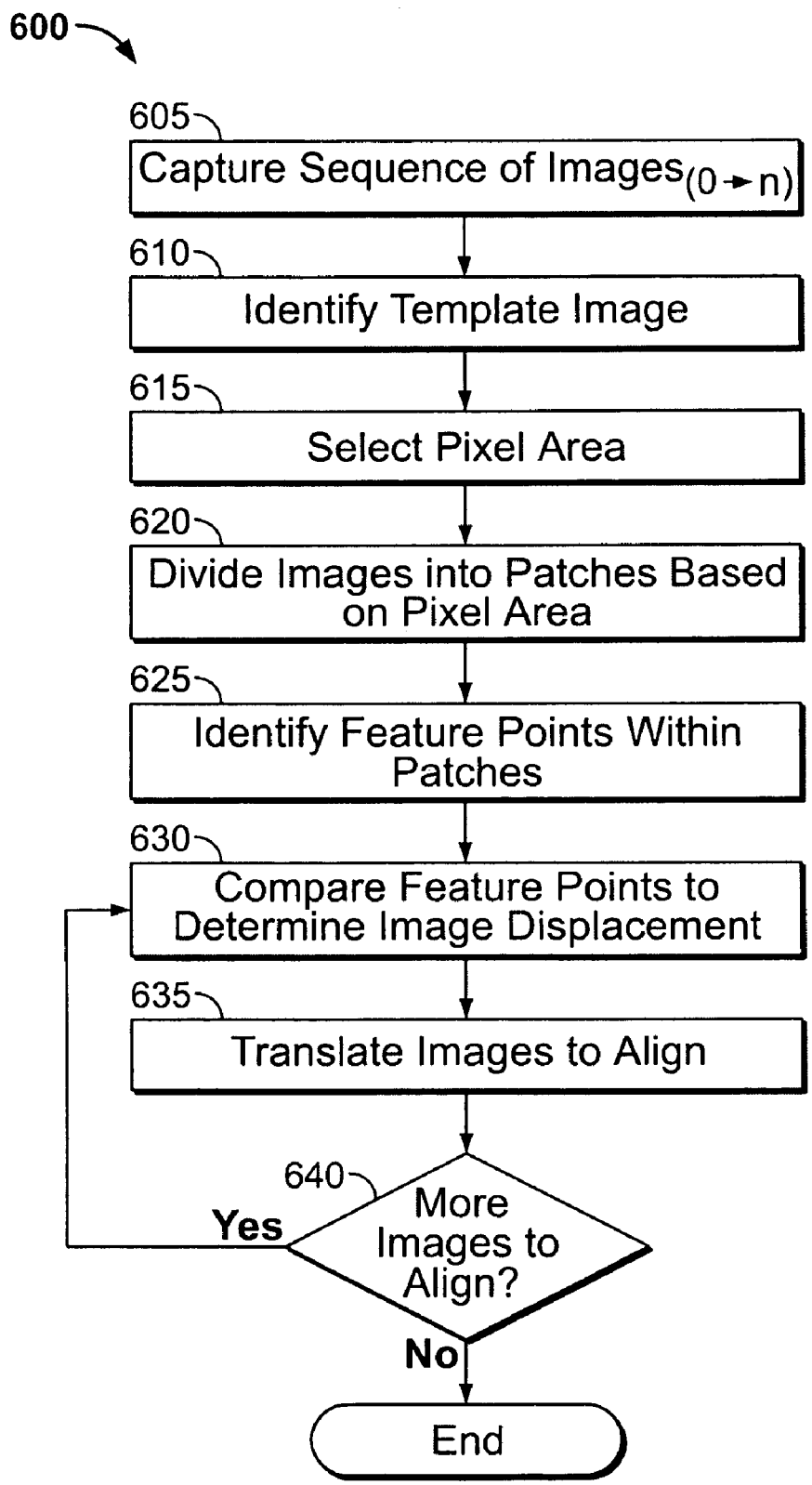
FIGS. 6A and 6B are flow diagrams illustrating exemplary methods of aligning images in a sequence of images.

FIG. 6A illustrates one method 600 of aligning images in a sequence of images according to a template-matching scheme. A photographic device captures a sequence of images of a natural scene (step 605). The photographic device can be a digital camera, camcorder or other image capturing device. A template image is identified (step 610). The template image can be an image in the sequence or an image of the same natural scene. The template image can be selected in response to user input; alternatively, the template image can be specified automatically. In one implementation, a default template image is the first image in the sequence.

A pixel area is selected for the template image (step 615). The pixel area represents a patch of the image. Factors that guide the pixel area selection can include the resolution of the image, the size of the image, and the computational capacity of the computer system. The pixel area can be identified in response to user input, such as commands specified on a keyboard or with a pointing device. In one implementation, the pixel area is 16×16 pixels square. The template image is divided into patches based on the predetermined number of pixels in the selected area (step 620). One or more feature points are identified within the patches of the template image (step 625). Feature points typically include edges and vertices of objects. Because any patches with uniform texture display no feature points, they can be excluded from the method.

An image in the sequence is selected and divided into patches in the same manner as the template image. Feature points are identified in the image. The feature points in the template image are compared to the feature points in patches of the image to identify a displacement for each of the images in the sequence relative to the template image (step 630). The image is translated horizontally and vertically until its feature points match those identified in the template image (step 635). These steps are repeated for each image in the sequence until all images are aligned with the template image (step 640). Typically, some degree of variation in pixel value is allowed for, as the images are not exact replicas of one another.

Figure 6B:
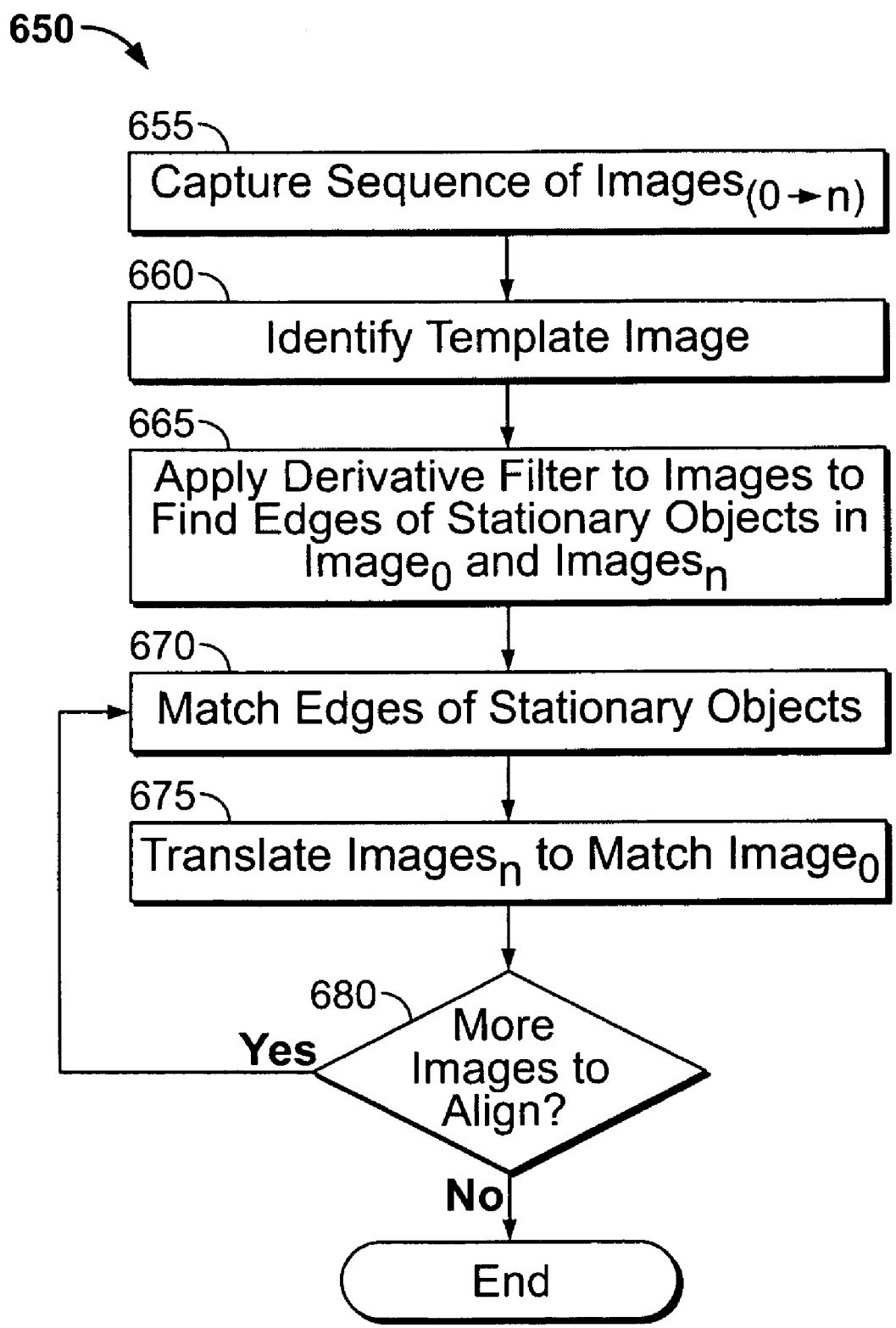

FIG. 6B illustrates an alternative alignment method 650. The images are captured with a photographic device (step 655), and a template image is identified (step 660) as described above in the context of method 600. A derivative filter is applied to each of the template and a subsequent image (step 665). The derivate filter produces large outputs at the edges of the objects. Stationary object edges will produce constant large outputs from image to image. The stationary object edges in the subsequent image are matched to the stationary object edges in the template image (step 670). The images are translated to align with the template image (step 675). The sequence of steps is repeated until all images in the sequence have been aligned (step 680).

In other implementations, three-dimensional rotational differences can also be accounted for and the images adjusted to reduce these differences. For example, the rotation and focal length of each image can be adjusted to match the template by estimating a pose for each image relative to the template image by minimizing the difference in ray directions that go through corresponding points of the image and template image. The minimization is formulated as a constrained least-squares problem with hard linear constraints for identical focal lengths and images in the sequence, as described in H. Shum and R. Szeliski, *Panoramic Image Mosaics*, Technical Report TR-97-23, Microsoft Research, 1997, which is incorporated by reference herein.

Because template matching is computationally intensive, a fast Fourier matching technique can be used to speed up the matching process. Other alignment techniques are known in the art and may be used in place of the above techniques. The alignment can be performed at a variety of different points in the process, such as before or after filtering the images, or before or after converting the images to the log opponent color domain.

Figure 7A:
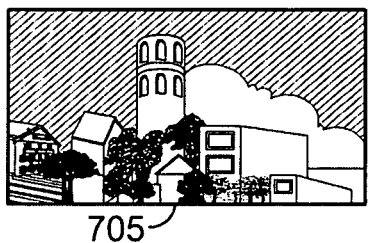
FIG. 7A is a representation of a sequence of images and a representation of the resulting image extracted from using multiple filters and the opponent color domain.
Figure 7A:
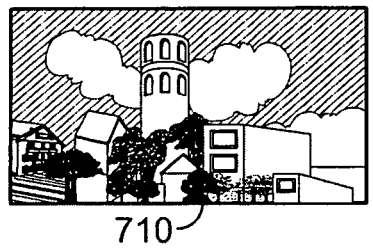
Figure 7A:
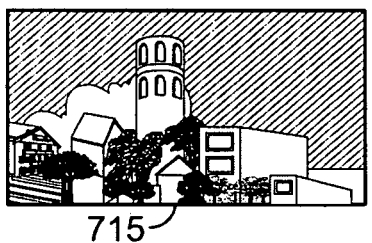
Figure 7A:
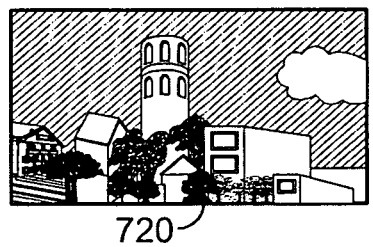
Figure 7A:
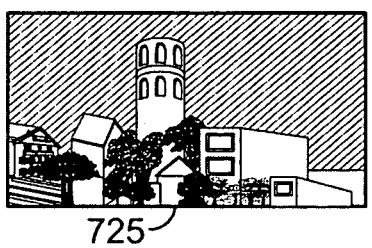
Figure 7A:
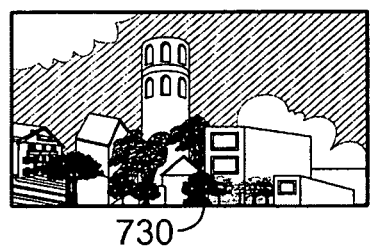
Figure 7A:
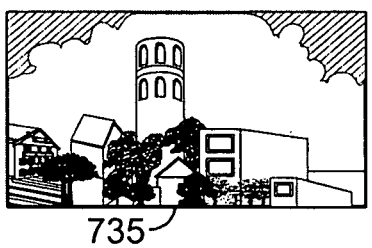
Figure 7A:
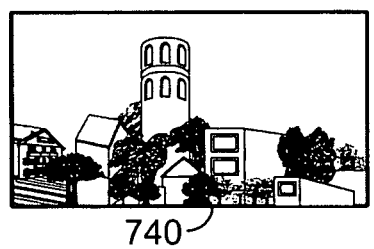
Figure 7A:
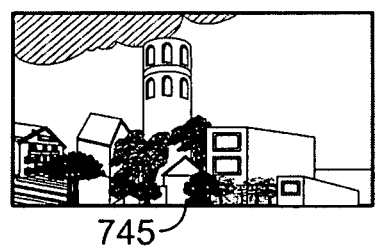
Figure 7A:
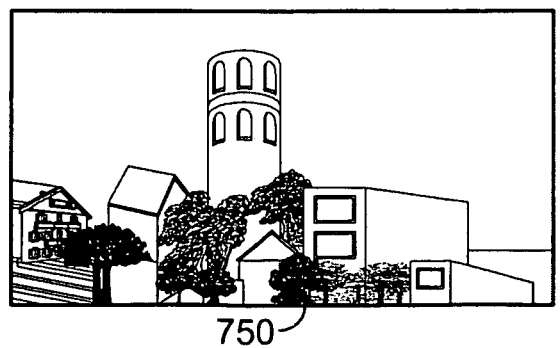
Figure 7B:
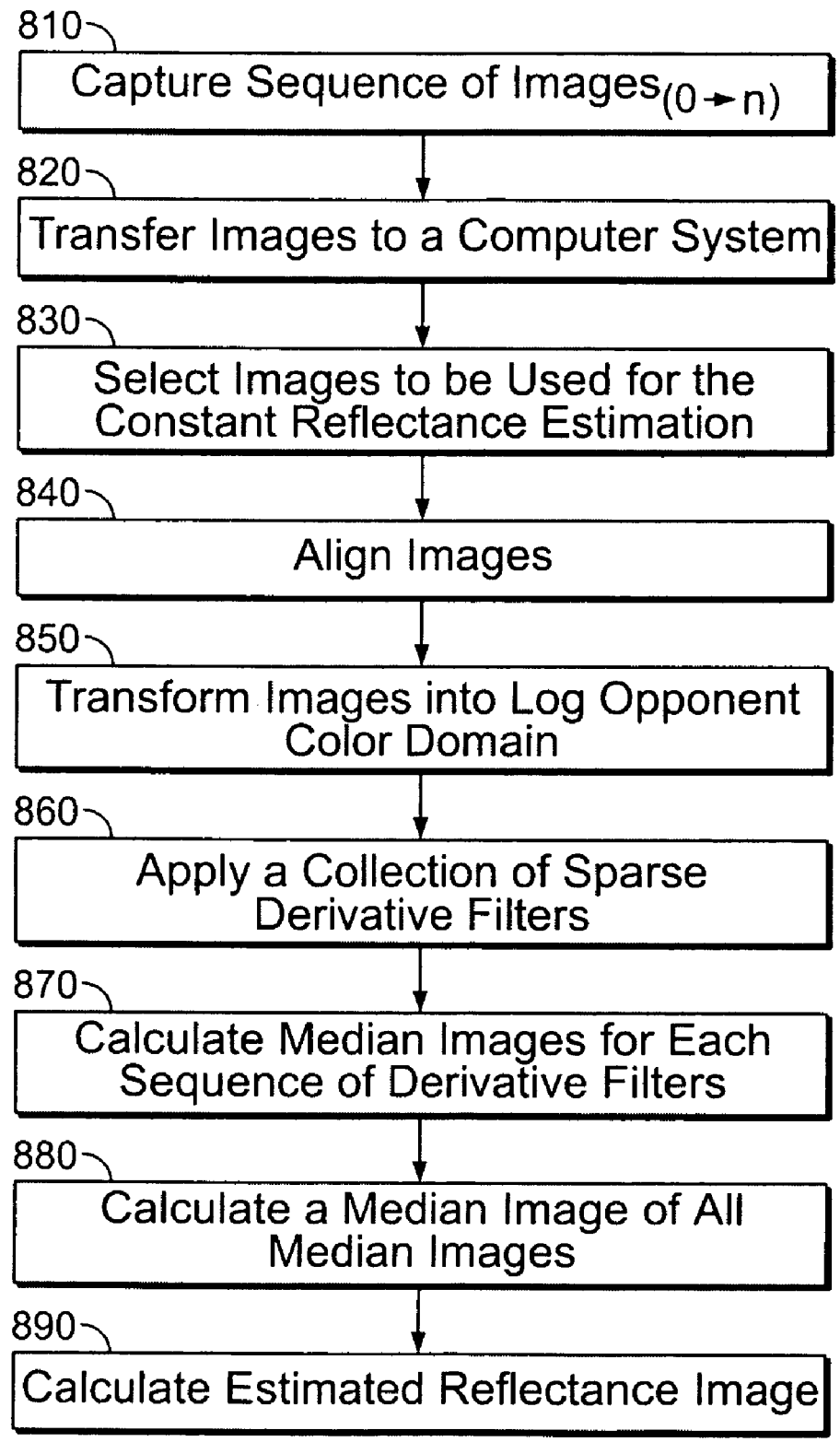
FIG. 7B is a flow diagram illustrating a method of estimating the reflectance of a natural scene from a sequence of images.

One implementation of a method for decomposing a series of images into a reflectance image and a series of illumination images is illustrated in more detail in FIGS. 7A and 7B. A sequence of images (represented by the illustrations 705, 710, 715, 720, 725, 730, 735, 740, 745) is captured by a photographic device (step 810). For example, natural images can be a sequence of images 705, 710, 715, 720, 725, 730, 735, 740, 745 taken with a tripod-mounted camera that depict a row of houses and a landmark against a background sky. The sequence of images 705, 710, 715, 720, 725, 730, 735, 740, 745 can be transferred to a computer system (step 820), such as a computer system with a Matlab implementation on a 2.4 GHz Intel Processor, if the photographic device is not capable of performing the necessary calculations. Images from the captured sequence are selected for the constant reflectance estimation (step 830). The selected images are aligned if the images are not registered to one another (step 840)—for example, if a tripod-mounted camera capturing the sequence of images was moved by the wind between the capture of individual images in the sequence. Each color image is transformed into the log opponent color domain (step 850). A collection of sparse derivative filters is then applied to each color space channel of each image (step 860).

At least two of the derivative filters are preferably oriented orthogonal to one another. Additional filters can be applied in different orientations. Lower frequency derivative filters can also be applied to the images. The user can input the frequencies of the filters to be applied to the images, or a frequency selection scheme can be programmed into the method. In some implementations, twenty to thirty filters can be employed, but any number of filters can be used.

A plurality of median images is then calculated, one median image per filter applied to the sequence of images (step 870). A median image is calculated for all the filtered image medians (step 880). From that median image, an estimated reflectance image 750 is calculated (step 890).

The techniques described herein can have applications other than estimating the constant reflectance of a natural scene. For example, the techniques can be used to remove foreground changes or illumination changes from a sequence of images. Similarly, the techniques can be used to edit the reflectance or the illumination of a sequence of images. For example, after first extracting the illumination and reflectance of the images in a sequence, the reflectance can be edited and each illumination reapplied to the edited reflectance to create a new sequence of images. Likewise, after extracting the illumination and reflectance images, one or more of the illumination images can be modified and the modified sequence of illumination images can be recombined with the reflectance image to create a new sequence of images. The techniques can also be used to construct a panoramic image, or as a component in a video matting system. The techniques can be applied to three-dimensional images as well as the two-dimensional examples depicted herein.

The invention can be implemented in digital electronic circuitry, or in computer hardware, firmware, software, or in combinations of them. The invention can be implemented as a computer program product, i.e., a computer program tangibly embodied in an information carrier, e.g., in a machine-readable storage device or in a propagated signal, for execution by, or to control the operation of, data processing apparatus, e.g., a programmable processor, a computer, or multiple computers. A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps of the invention can be performed by one or more programmable processors executing a computer program to perform functions of the invention by operating on input data and generating output. Method steps can also be performed by, and apparatus of the invention can be implemented as, special purpose logic circuitry, e.g., an FPGA (field programmable gate array) or an ASIC (application-specific integrated circuit). Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in special purpose logic circuitry.

The invention has been described in terms of particular embodiments. Other embodiments are within the scope of the following claims. For example, the steps of the invention can be performed in a different order and still achieve desirable results.

What is claimed is:

1. A computer-implemented method for decomposing images in a sequence of images representing a scene, the method comprising:
   transforming images in a sequence of images into a log opponent color domain;
   applying a plurality of filters to the transformed images to generate a plurality of sequences of filtered images, the plurality of filters including a derivative filter to be applied to produce a derivative in a first direction and a derivative filter to be applied to produce a derivative in a second direction, where the first and second directions are different directions;
   calculating a median image for each of the plurality of sequences of filtered images; and
   using the median images to produce a reflectance image for the sequence of images, the reflectance image representing an image the application to which the plurality of filters would yield substantially the calculated median images for the sequences of filtered images.

2. The method of claim 1, further comprising:
   calculating a sequence of illumination images corresponding to the images in the sequence of images, each image in the sequence of images represented as a product of the reflectance image and an illumination image of the sequence of illumination images.

3. The method of claim 2, further comprising:
   modifying one or more of the reflectance image or the illumination images; and combining the reflectance image and the illumination images, including the one or more modified images, to create a new sequence of images.

4. The method of claim 2, further comprising:
   modifying one or more of the reflectance image or the illumination images; and
   using the reflectance and illumination images, including the modified image or images, to generate a new image.

5. The method of claim 1, wherein:
   applying the plurality of filters includes applying each of the plurality of filters to each of a luminance and chrominance channels of the opponent color space for each pixel in each image in the sequence of images.

6. The method of claim 1, wherein:
   producing a reflectance image includes producing a reflectance image having a minimum least squared error between the result of application of each of the plurality of filters to the reflectance image and the calculated median image for the corresponding sequence of filtered images.

7. The method of claim 1, wherein:
   applying a plurality of filters includes applying three or more filters to the transformed images.

8. The method of claim 7, wherein:
   the plurality of filters includes one or more derivative filters in addition to the derivative filter to be applied to produce a derivative in the first direction and the derivative filter to be applied to produce a derivative in the second direction, the additional derivative filters being applied to produce a derivative in one or more directions other than the first and second directions.

9. The method of claim 7, wherein:
   the plurality of filters includes filters operable to produce a derivative at a plurality of different frequencies.

10. The method of claim 1, further comprising:
    aligning the images prior to transforming the images.

11. The method of claim 1, further comprising:
    aligning the filtered images prior to calculating the median image.

12. A computer program product embodied on a computer readable medium for decomposing images in a sequence of images representing a scene, the computer program product comprising instructions operable to cause a computer system to:
    transform images in a sequence of images into a log opponent color domain;
    apply a plurality of filters to the transformed images in the sequence of images, the plurality of filters including a derivative filter to be applied to produce a derivative in a first direction and a derivative filter to be applied to produce a derivative in a second direction, where the first and second directions are different directions;
    calculate a plurality of median images, one for each sequence of filtered images; and
    produce a reflectance image for the sequence of images, the reflectance image representing an image the application to which the plurality of filters would yield substantially the calculated median image for the sequence of filtered images.

13. The computer program product of claim 12, further comprising instructions operable to cause a computer system to:
    calculate a sequence of illumination images corresponding to the images in the sequence of images, each image in the sequence of images represented as a product of the reflectance image and an illumination image of the sequence of illumination images.

14. The computer program product of claim 13, further comprising instructions operable to cause a computer system to:
    modify one or more of the reflectance image or the illumination images; and
    combine the reflectance image and the illumination images, including the one or more modified images, to create a new sequence of images.

15. The computer program product of claim 13, further comprising instructions operable to cause a computer system to:
    modify one or more of the reflectance image or the illumination images; and use the reflectance and illumination images, including the modified image or images, to generate a new image.

16. The computer program product of claim 12, wherein: the instructions operable to cause a computer system to apply the plurality of filters include instructions operable to cause a computer system to apply each of the plurality of filters to each of a luminance and chrominance channels of the opponent color space for each pixel in each image in the sequence of images.

17. The computer program product of claim 12, wherein the instructions operable to cause a computer system to produce a reflectance image include instructions operable to cause a computer system to produce a reflectance image having a minimum least squared error between the result of application of the plurality of filters to the reflectance image and the calculated median image for the sequence of images.

18. The computer program product of claim 12, wherein: the instructions operable to cause a computer system to apply a plurality of filters include instructions operable to cause a computer system to apply three or more filters to the images in the sequence of images.

19. The computer program product of claim 18, wherein: the three or more filters include one or more derivative filters in addition to the derivative filters applied to produce a derivative in the first and second directions, the additional derivative filters being applied to produce a derivative in one or more directions other than the first and second directions.

20. The computer program product of claim 18, wherein: the three or more filters include one or more filters operable to produce a derivative at a plurality of different frequencies.

21. The computer program product of claim 12, further comprising instructions operable to cause a computer system to:
align the images prior to transforming the images into the log opponent color domain.

22. The computer program product of claim 12, further comprising instructions operable to cause a computer system to:
align the filtered images prior to calculating the median image.

23. A method for extracting the constant reflectance component from a sequence of images of a natural scene comprising:
capturing a sequence of images of a scene;
aligning each of the images of the sequence of images;
transforming each of the images in the sequence of images into a log opponent color domain;
applying a plurality of filters to the images in the sequence of images, the plurality of filters including a derivative filter to be applied to produce a derivative in a first direction, a derivative filter to be applied to produce a derivative in a second direction, where the first and second directions are different directions, and one or more additional filters;
calculating a median image for each sequence of filtered images; and
producing a reflectance image for the Original sequence of images, the reflectance image having a minimum least squared error between the result of application of each of the plurality of filters to the reflectance image and the calculated median image for the corresponding sequence of filtered images.

24. A system for decomposing images in a sequence of images representing a scene, the system comprising:
a computer system comprising:
a processor for executing instructions;
a computer-readable memory for storing executable instructions; and
an image processing program, stored on the computer-readable memory and including instructions operable to cause the processor to:
transform images in a sequence of images into a log opponent color domain;
apply a plurality of filters to the transformed images in the sequence of images, the plurality of filters including a derivative filter to be applied to produce a derivative in a first direction and a derivative filter to be applied to produce a derivative in a second direction, where the first and second directions are different directions;
calculate a plurality of median images, one for each sequence of filtered images; and
produce a reflectance image for the sequence of images, the reflectance image representing an image the application to which the plurality of filters would yield substantially the calculated median image for the sequence of filtered images.

25. The system of claim 24, wherein the image processing program further includes instructions operable to cause the processor to:
calculate a sequence of illumination images corresponding to the images in the sequence of images, each image in the sequence of images represented as a product of the reflectance image and an illumination image of the sequence of illumination images.

26. The system of claim 25, wherein the image processing program further includes instructions operable to cause the processor to:
modify one or more of the reflectance image or the illumination images; and
combine the reflectance image and the illumination images, including the one or more modified images, to create a new sequence of images.

27. The system of claim 25, wherein the image processing program further includes instructions operable to cause the processor to:
modify one or more of the reflectance image or the illumination images; and
use the reflectance and illumination images, including the modified image or images, to generate a new image.

28. The system of claim 24, wherein:
the instructions operable to cause the processor to apply the plurality of filters include instructions operable to cause the processor to apply each of the plurality of filters to each of a luminance and chrominance channels of the opponent color space for each pixel in each image in the sequence of images.

29. The system of claim 24, wherein:
the instructions operable to cause the processor computer system to produce a reflectance image include instructions operable to cause the processor to produce a reflectance image having a minimum least squared error between the result of application of the plurality of filters to the reflectance image and the calculated median image for the sequence of images.

30. The system of claim 24, wherein:
the instructions operable to cause the processor to apply a plurality of filters include instructions operable to cause the processor to apply three or more filters to the images in the sequence of images.

31. The system of claim 30, wherein:
the three or more filters include one or more derivative filters in addition to the derivative filters applied to produce a derivative in the first and second directions, the additional derivative filters being applied to produce a derivative in one or more directions other than the first and second directions.

32. The system of claim 30, wherein:
the three or more filters include one or more filters operable to produce a derivative at a plurality of different frequencies.

33. The system of claim 24, wherein the image processing program further includes instructions operable to cause the processor to:
align the images prior to transforming the images into the log opponent color domain.

34. The system of claim 24, wherein the image processing program further includes instructions operable to cause the processor to:
align the filtered images prior to calculating the median image.

* * * * *

UNITED STATES PATENT AND TRADEMARK OFFICE
CERTIFICATE OF CORRECTION

PATENT NO.         : 7,433,540 B1                                         Page 1 of 1
APPLICATION NO.    : 10/643279
DATED              : October 7, 2008
INVENTOR(S)        : Michael D. Schuster It is certified that error appears in the above-identified patent and that said Letters Patent is hereby corrected as shown below:

Cover Page item [56] - OTHER PUBLICATIONS:
    right column, line 4:
        delete "simplecell", and replace with --simple-cell-- right column, line 10:
        delete "Image", and replace with --Images-- right column, line 10:
        delete "Henderson", and replace with --Hanson--

Cover Page item [57] - ABSTRACT:
    right column, line 29:
        delete "which", and replace with --in which--

Claim 26:
    column 15, line 10:
        delete "wherein", and replace with --wherein:--

Claim 41:
    column 15, line 60:
        delete "Original", and replace with --original--

Signed and Sealed this

Fifth Day of May, 2009

JOHN DOLL
*Acting Director of the United States Patent and Trademark Office*